United States Patent [19]

Hagedorn

[11] Patent Number: 4,654,070
[45] Date of Patent: Mar. 31, 1987

[54] UNIVERSAL-TYPE INTERRUPTION CLOSURE FOR APPARATUS FOR BENDING GLASS SHEETS

[75] Inventor: Floyd T. Hagedorn, Oregon, Ohio

[73] Assignee: Libbey-Owens-Ford Co., Toledo, Ohio

[21] Appl. No.: 780,037

[22] Filed: Sep. 25, 1985

[51] Int. Cl.[4] .............................................. C03B 23/023
[52] U.S. Cl. ....................................... 65/289; 65/107; 65/273; 65/290
[58] Field of Search .................. 65/106, 107, 273, 287, 65/289, 290

[56] References Cited

U.S. PATENT DOCUMENTS 2,570,309 10/1951 Black ........................................ 65/107
4,496,386 1/1985 Hymore et al. ................... 65/104 X Primary Examiner—Arthur Kellogg
Attorney, Agent, or Firm—Marshall & Melhorn

[57] ABSTRACT

An interruption closure apparatus for closing an interruption in a glass bending shaping rail includes a rail segment attached to one side of a plate and a universal joint attached to an opposite side of the plate. The universal joint is also attached to one end of an arm which in turn is rotatably connected to a shaft for rotating the rail segment into and out of an interruption in the shaping rail. A stop member attached to the arm limits movement of the plate to prevent rotational misalignment with the interruption in the shaping rail. A plurality of screws are threaded through apertures in the plate into contact with an under surface of adjacent portions of the shaping rail when the rail segment is in the interruption. Rotation of the screws permits the positioning of an upper surface of the rail segment with respect to an upper surface of the adjacent portions of the shaping rail to provide an uninterrupted smooth edge portion in a glass sheet being formed on the rail.

15 Claims, 7 Drawing Figures

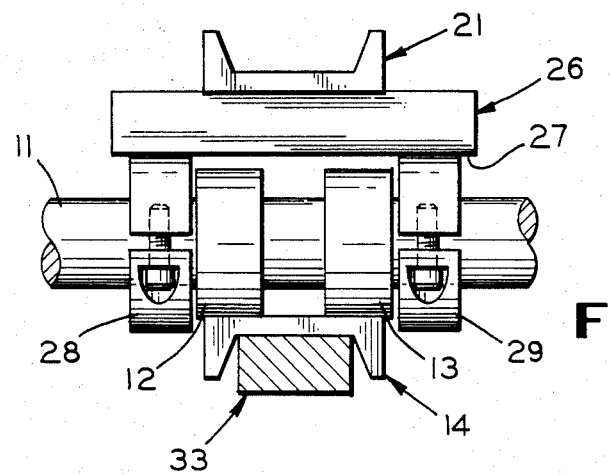
FIG. 4
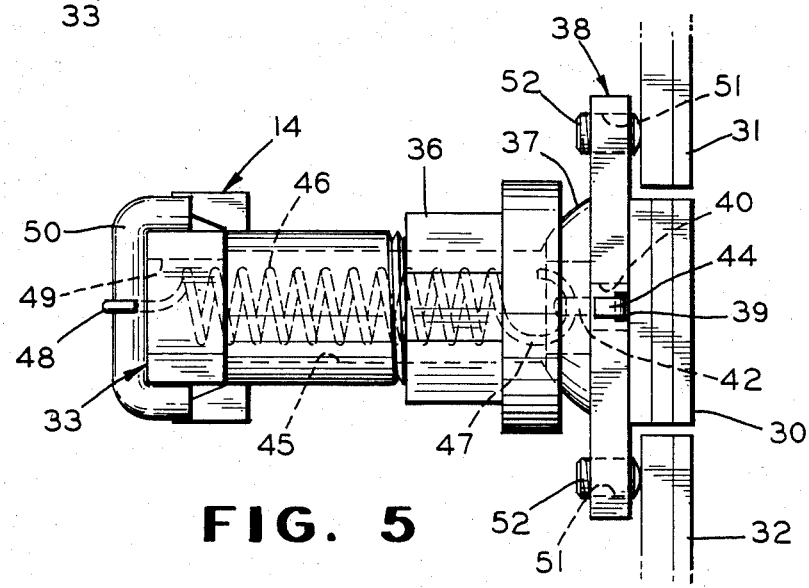
FIG. 5
FIG. 6
FIG. 7

UNIVERSAL-TYPE INTERRUPTION CLOSURE FOR APPARATUS FOR BENDING GLASS SHEETS

BACKGROUND OF THE INVENTION

The present invention relates generally to the production of bent glass sheets and, more particularly, to an improved apparatus for bending specifically configured glass sheets.

Bent sheets of glass are commonly used as glazing closures in vehicles such as automobiles and the like. It is often desirable to shape or form the glass in a manner to carry out styling features found in the adjacent sheet metal components in order to create the appearance of unity between the glass and the sheet metal. For example, certain automotive backlights have inturned side portions extending into the side surfaces of the vehicle and into the roof line of the vehicle as well as the deck lid, respectively. The press bending apparatus of the type required to achieve such shapes typically employs a structure wherein the female member of the mold set is in the form of a ring having a portion thereof segmented to permit passage of the ring upwardly through an associated array of conveying rolls during the bending operation as illustrated and described in U.S. Pat. No. 4,305,746 entitled "Method of and Apparatus for Bending Glass Sheets", Floyd T. Hagedorn et al, issued Dec. 15, 1981. In certain instances, the discontinuities in the female ring has caused slight ripple effects in the edges of the glass sheet being formed.

An improved method and apparatus for bending glass sheets is disclosed in U.S. Pat. No. 4,496,386 entitled "Method of and Apparatus for Bending Glass Sheets", Frank J. Hymore et al, issued Jan. 29, 1985. The apparatus includes a press member of outline or ring-type construction having an array of spaced apart shaping rail elements mounted in a composite array and adapted to pass upwardly between adjacent conveying rolls to contact and support the undersurface of a sheet of heat-softened glass. Another array of shaping rail extensions is disposed above the conveying rolls mounted for movement into and out of association with the spaces between the spaced apart shaping rail elements of the first mentioned array.

SUMMARY OF THE INVENTION

The elimination of edge ripple is especially important in automobile windshields. The present invention is an improvement in the interruption closure provided by the movable array of shaping rail extensions disclosed in U.S. Pat. No. 4,496,386 identified above. Each shaping rail extension is mounted on a spring biased arm with a universal-type connection. The male portion of the universal includes an elongated mounting plate that supports the rail extension and extends beyond the transverse edges thereof. The exposed ends of the mounting plate seat against the back sides of the female ring segments to properly position the rail extension in the ring interruption. Fine adjustments may be made to the relative position of the rail extension with respect to the female ring by adjustment screws provided on the four corners of the mounting plate.

It is an object of the present invention to produce an improved apparatus for bending glass sheets into complex shapes and assuring a smooth uninterrupted edge portion in the final formed product.

Another object of the invention is to produce in the foregoing apparatus an arrangement for bending a glass sheet toward its ultimately desired configuration and, at all times, assuring an uninterrupted smooth edge portion in the formed glass sheet.

Still another object of the present invention is to produce a press apparatus retaining the advantages found in the modified outline-type press member of U.S. Pat. No. 4,305,746 and U.S. Pat. No. 4,496,386 in combination with other features to effect the desired complex shape in a heated glass sheet.

It is a further object of this invention to combine with the foregoing press apparatus rail extensions which are selectively movable into the spaces between the segmented ring portions prior to the final bending of the associated glass sheet.

The foregoing and other objects, advantages, and features of the present invention will become readily apparent to one skilled in the art from considering the following detailed description of a preferred embodiment of the invention when considered in the light of the accompanying drawings wherein like reference numerals denote like parts throughout the various views.

BRIEF DESCRIPTION OF THE DRAWINGS

FIG. 4 is a vertical sectional view taken along line 4—4 of FIG. 2;

FIG. 5 is an end elevational view of the interruption closure apparatus of FIG. 1 shown in cooperation with a portion of a shaping rail;

FIG. 6 is a top plan view of a portion of the interruption closure shown in FIG. 1 including a stop member; and FIG. 7 is a sectional view taken along line 7—7 of FIG. 6.

DESCRIPTION OF THE PREFERRED EMBODIMENT

Figure 1:
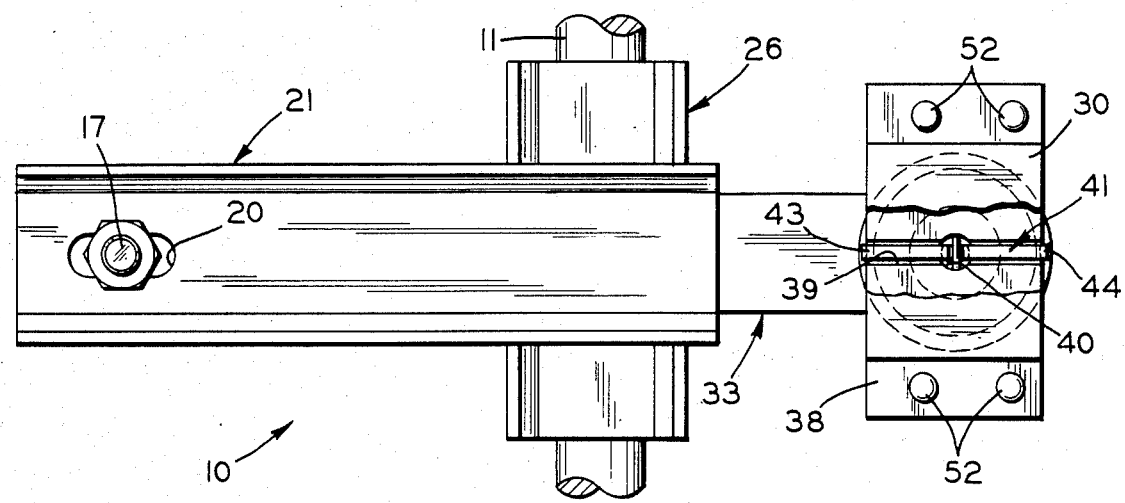
FIG. 1 is a top plan view of an interruption closure assembly in accordance with the present invention.
Figure 2:
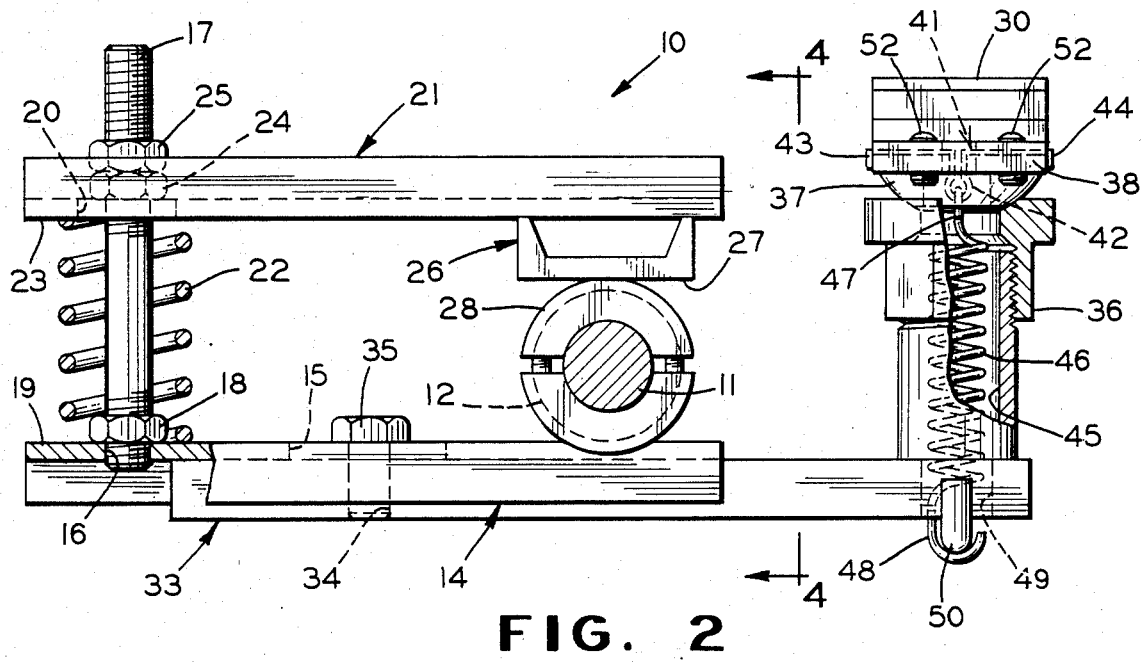
FIG. 2 is a side elevational view of the interruption closure apparatus of FIG. 1, partly in section.
Figure 3:
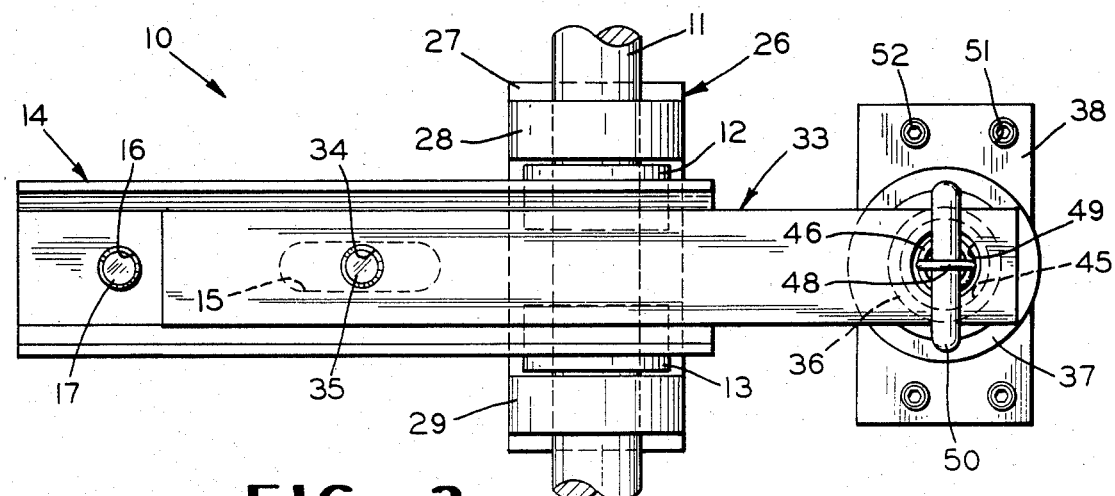
FIG. 3 is a bottom plan view of the interruption closure apparatus of FIG. 1.

The present invention is an improved interruption closure apparatus for use in the apparatus for press bending sheets of glass disclosed in U.S. Pat. No. 4,496,386, which patent is incorporated herein by reference. There is shown in the above-identified patent an interdigitating rail extension in FIG. 5 through FIG. 7. This rail extension is connected to a supporting beam 222. The beam 222 is affixed to the undersurface of a plate member 226 which in turn is supported by bearing members 230 which are adapted to be slidingly supported on a pair of spaced apart, parallel guide shafts 232. The guide shafts 232 are, in turn, supported by a series of brackets 234 which depend from a shaft supporting plate 236 secured to the undersurface of a base member 100. The supporting beam 222 is caused to be moved horizontally by a rack and pinion assembly 238 the mechanism of which is identical in all structural and operational aspects to the rack and pinion assembly 154 employed to effect movement of the articulated end sections 132 and 134 of the lower press member 64. All of this mechanism is shown in FIG. 5 of the above-identified patent.

Referring to the present drawings, there is shown an interruption closure apparatus 10 according to the present invention. The apparatus 10 is attached to and rotates with a shaft 11. The shaft 11 can be driven in rotation by one of the connecting rods 172' and 176' shown in FIG. 5 of the above-identified patent. A conventional means for translating linear motion to rotary motion can be utilized between the connecting rod and the shaft such as a rack and pinion or a crankarm on the shaft.

The shaft 11 extends through a center aperture in each of a pair of annular shaft collars 12 and 13. The shaft collars 12 and 13 are attached to one end of a downwardly facing U-shaped channel member 14. The shaft collars 12 and 13 are positioned at opposite edges of the center section of the channel member 14 such that the longitudinal axis of the channel member 14 extends perpendicular to the longitudinal axis of the shaft 11. An elongated aperture 15 extending along the longitudinal axis of the channel member 14 is formed in a central section of the channel member. At the end of the channel member 14 opposite the shaft collars 12 and 13, there is formed a threaded aperture 16. A threaded rod 17 is engaged in the aperture 16 to a depth determined by a stop nut 18 which engages an upwardly facing surface 19 of the channel 14.

An upper end of the rod 17 passes through an elongated aperture 20 formed in a second U-shaped channel member 21 facing in an upward direction. A helical compression spring 22 is positioned concentric with the rod 17 between the surface 19 and a downwardly facing surface 23 of the channel member 21. A pair of stop nuts 24 and 25 are threaded onto the rod 17 and into engagement with the channel member 21. The stop nut 24 is utilized to determine the distance between the surfaces 19 and 23 and the stop nut 25 is utilized to lock the assembly in position on the rod 17 once the proper positioning has been set. The channel member 21 is approximately the same length as the channel member 19 and extends in a generally parallel direction. At an end opposite the aperture 20, a U-shaped cross channel member 26 is attached to the lower surface 23. The longitudinal axis of the cross member 26 is perpendicular to the longitudinal axis of the channel member 21. The cross channel member 26 is upwardly facing and has a lower surface 27 to which a pair of split shaft collar members 28 and 29 are attached at opposite ends thereof. The shaft collars clamp the shaft 11 such that the interruption closure assembly 10 rotates with the shaft 11. The split shaft collars 28 and 29 are spaced apart such that the shaft collars 12 and 13 are located therebetween.

A shaping rail extension or ring segment 30 is mounted on the interruption closure apparatus 10 for positioning in a gap between a pair of fixed rail elements or ring segments 31 and 32 as shown in FIG. 5. The ring segment 30 is carried on an arm 33. A threaded aperture 34 is formed in one end of the arm 33 to accept a bolt 35 which is inserted through the elongated aperture 15. The head of the bolt 35 engages the upper surface 19 of the channel member 14 and draws the arm 33 into the channel to hold the arm 33 in position. The elongated aperture 15 permits a predetermined amount of longitudinal adjustment of the arm 33 with respect to the shaft 11.

At the end of the arm 33 opposite the threaded aperture 34 there is attached a mounting extension for the ring segment 30 formed of a nipple and female union 36. The female end of the nipple and union 36 accepts a union male end 37 which is attached to one side of a plate 38. A central groove 39 is formed in the other side of the plate 38 extending from one edge thereof to the other. A central aperture 40 extends through the plate 38 in the center of the groove 39. A cotter pin 41 has a head end 42 which extends through the central aperture 40 and into a central aperture formed in the union male end 37. The legs 43 and 44 of the cotter pin 41 are bent to extend in opposite directions along the groove 39 and then are bent again at right angles and affixed to the side edges of the plate 38 as by welding. The ring segment 30 is attached to the upper side of the plate 38 covering the groove 39 and the cotter pin 41.

A central aperture 45 extends from the aperture in the union male end 37 through the nipple and female union 36 to the arm 33. A helical tension spring 46 extends through the aperture 45 and has a hook 47 formed at one end thereof for engaging the head end 42 of the cotter pin 41. An aperture 49 is formed in the arm 33 and the spring 46 extends into the aperture 49. At the end of the spring 46 opposite the hook 47, a hook 48 is formed which extends outside the aperture 49. A U-shaped rod 50 extends around the arm 33 and is engaged by the hook 48 of the spring 46 such that the spring 46 tensions the plate 38 and union male end 37 into the female union 36. The thickness of the segment 30 is greater than the thickness of the adjacent segments 31 and 32 such that the upper surface of the plate 38 is spaced from the adjacent surfaces of the segments 31 and 32. A threaded aperture 51 is formed at each corner of the plate 38 to accept an adjustment screw 52. The adjustment screws 52 can be threaded into engagement with the facing surfaces of the segments 31 and 32 to adjust the upper surface of the segment 30 into planar alignment with the like facing surfaces of the segments 31 and 32 thereby closing the interruption in the ring. The female union 36 and the male union 37 provide a universal-type joint to permit such adjustment of the segment 30 relative to the remainder of the interruption closure 10.

There is shown in FIG. 6 and FIG. 7 a stop member 53 for limiting the movement of the ring segment 30. The stop member 53 is formed from a rod bent in a V-shape. The bottom end 54 of the V-shape stop member 53 is attached to an upwardly facing surface of the arm 33 by any conventional means such as welding. The stop member 53 extends upwardly in a pair of arms 55 and 56 which terminate adjacent an edge 57 of the plate 38. Thus, the ends of the arms 55 and 56 limit counterclockwise and clockwise rotation respectively of the plate 38 as viewed in FIG. 6. The stop means 53 thereby prevents excessive rotation of the ring segment 30 with respect to the preferred orientation shown in FIG. 5 thereby avoiding the opportunity for the outwardly facing surface of the ring segment 30 to come into contact with the fixed rail elements 31 and 32 as the interruption closure apparatus according to the present invention is positioned in the gap between the fixed rail elements.

From the foregoing, it is apparent that the objects of this invention have been fully accomplished. As a result of this invention, an improved apparatus is produced for bending glass sheets in a mass production operation to produce heretofor unobtainable complex shapes. It is to be understood that the form of the invention herein illustrated and described is to be taken as an illustrative embodiment, and that various changes in shape, size, and arrangement of parts, as well as various procedural changes, may be resorted to without departing from the spirit of the invention.

What is claimed is:

1. An interruption closure apparatus for closing an interruption in a glass bending shaping rail comprising:
   a rail segment attached to one side of a plate;
   means engaging an adjacent shaping rail segment for selectively positioning said rail segment relative to said adjacent shaping rail segment;
   a first universal joint member attached to an opposite side of said plate;
   a second universal joint member attached to an arm and cooperating with said first universal joint member for permitting movement of said plate and said rail segment relative to said arm; and
   means for rotating said arm and said rail segment into and out of said interruption in said shaping rail.

2. The apparatus according to claim 1 wherein said means for selectively positioning includes at least one adjusting screw engaging a threaded aperture formed in said plate and extending into engagement with said adjacent shaping rail segment for positioning an upper surface of said rail segment relative to an upper surface of said adjacent shaping rail segment.

3. The apparatus according to claim 1 wherein said means for selectively positioning includes a plurality of adjusting screws each engaging a corresponding threaded aperture formed in said plate, each of said adjusting screws extending into engagement with an adjacent shaping rail segment for positioning an upper surface of said rail segment relative to an upper surface of each of said adjacent shaping rail segments.

4. The apparatus according to claim 1 wherein said means for rotating includes a first channel member attached to said arm and a second channel member connected between said first channel member and a rotatable shaft.

5. The apparatus according to claim 4 wherein said second channel member is attached to said shaft by a split collar, said first channel member is attached to an annular collar member through which said shaft extends, said first and second channel members being positioned on opposite sides of said shaft and substantially parallel to one another, a threaded rod engaging a threaded aperture in said first channel member and extending through a slot formed in said second channel member, and a stop nut threadably engaging said rod and abutting said second channel member for selectively spacing said first and second channel members from one another.

6. The apparatus according to claim 5 including a helical coil spring positioned between said first and second channel members to bias said second channel member against said stop nut.

7. The apparatus according to claim 1 including a stop member attached to said arm and positioned adjacent said plate for limiting the movement of said plate and said rail segment relative to said arm.

8. In an apparatus for bending a glass sheet including a plurality of spaced apart conveyor rolls for moving a heat softened glass sheet along a path, a movable bending member having an outline shaping rail provided with a shaping surface conforming to the marginal outline of the glass sheet to be bent, at least a portion of the rail being interrupted to permit passage of the bending member upwardly through the conveyor rolls, an auxiliary array of shaping rail extensions adapted to substantially fill at least a portion of the interruptions of the outline shaping rail of said bending member above said conveyor rolls, means for moving the bending member and the associated shaping surfaces along a path normal to and through the conveyor rolls, and means for moving the array of shaping rail extensions relative to the interruptions of the outline shaping rail to effect the desired bending of the glass sheet, the means for moving the array of shaping rail extensions comprising:
   a shaft;
   means connected to said shaft for rotating said shaft;
   an arm connected to said shaft; and
   one of the shaping rail extensions connected to said arm whereby said one shaping rail extension is rotated into and out of a corresponding interruption in the shaping rail as said shaft is rotated.

9. The means for moving the array of shaping rail extensions according to claim 8 including means for selectively positioning said one shaping rail extension relative to adjacent portions of a shaping rail.

10. The means for moving the array of shaping rail extensions according to claim 9 wherein said means for selectively positioning includes a plurality of adjusting screws each engaging a threaded aperture in a plate attached to said one shaping rail extension and extending into contact with said adjacent portions of said shaping rail.

11. The means for moving the array of shaping rail extensions according to claim 10 wherein said plate is connected to said arm by a universal joint.

12. An interruption closure apparatus for closing an interruption in a glass bending shaping rail comprising:
   a shaping rail extension attached to means for moving said rail extension into and out of an interruption in a shaping rail including an arm having one end attached to said shaping rail extension and an opposite end rotatably attached to a shaft;
   a universal joint connected between said shaping rail extension and said means for moving; and
   means for selectively positioning said shaping rail extension relative to adjacent portions of said shaping rail.

13. The apparatus according to claim 12 wherein said means for selectively positioning includes a plate attached to said shaping rail extension, at least a pair of screws threadly engaging said plate and extending into contact with said adjacent portions of said shaping rail whereby an upper surface of said shaping rail extension is positioned relative to an upper surface of each of said adjacent portions of said shaping rail as said screws are rotated.

14. The apparatus according to claim 12 wherein said means for moving includes a pair of channel members, a first one of said channel members having one end connected to said shaft for rotation therewith, a second one of said channel members having one end rotatably attached to said shaft, said first and second channel members each having an opposite end spring biased apart a predetermined distance, said second channel member being attached to said arm.

15. The apparatus according to claim 12 including a stop means attached to said means for moving and extending adjacent said shaping rail extension for limiting the movement of said shaping rail extension relative to said means for moving.

* * * * *